Oct. 23, 1945.    R. G. ANDERSON    2,387,634
PISTON CONNECTION
Filed Jan. 24, 1944
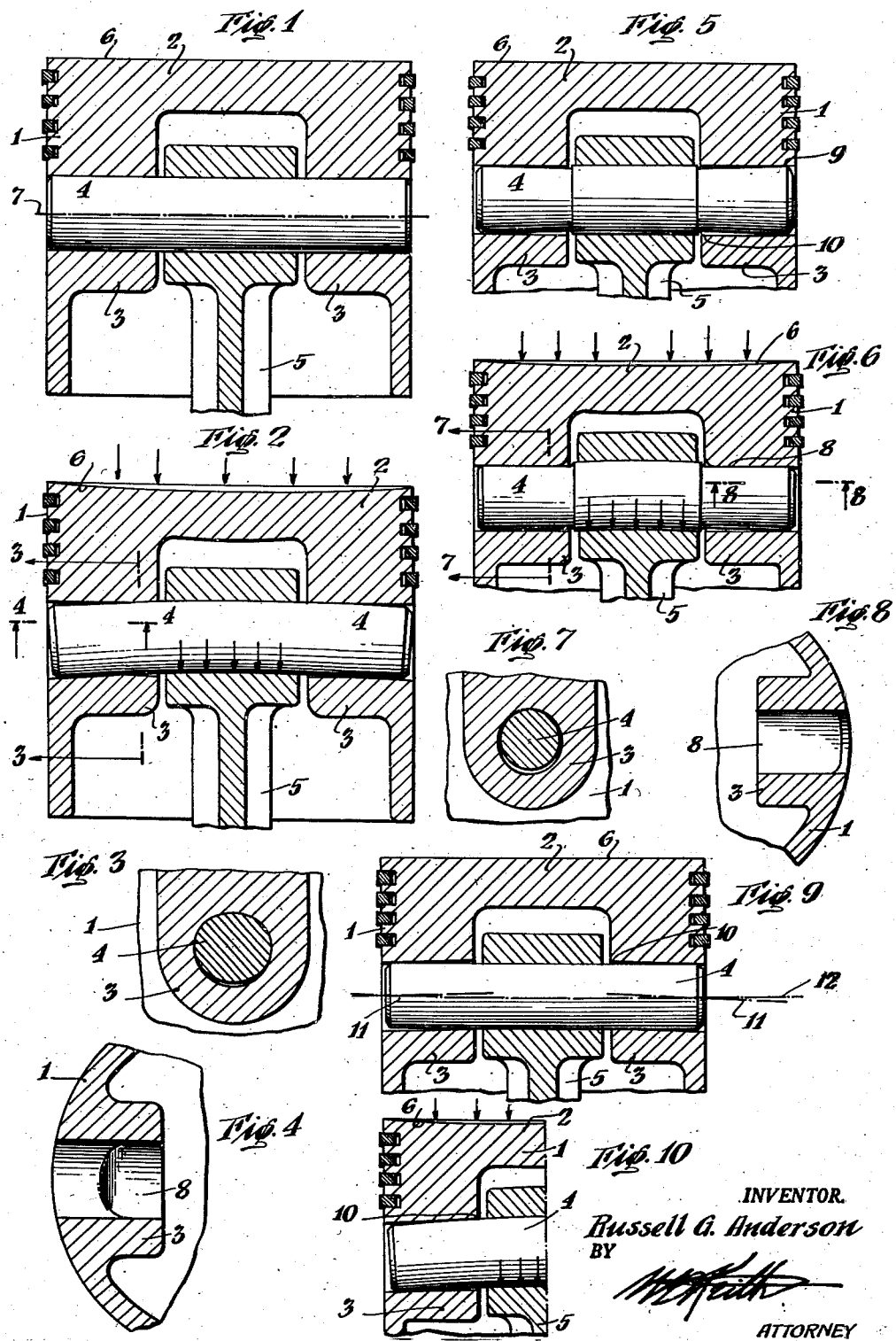
INVENTOR.
Russell G. Anderson
BY
ATTORNEY Patented Oct. 23, 1945

2,387,634

UNITED STATES PATENT OFFICE 2,387,634

PISTON CONNECTION

Russell G. Anderson, Bedford, Ohio, assignor to Aluminum Company of America, Pittsburgh, Pa., a corporation of Pennsylvania Application January 24, 1944, Serial No. 519,450

3 Claims. (Cl. 309—19)

This invention relates to piston assemblies which include a wrist pin engaged within the wrist pin bosses of a piston and to improvements in such assemblies whereby the relation between the engaging surfaces of pin and boss is so established as to minimize local stress during operation and to thereby minimize boss and pin distortion.

In the operation of a piston within an engine, the driving forces, such as are generated by combustion, are transmitted from the piston head through the pin bosses to the wrist pin located therein and from there to the connecting rod which directly connects the pin, and indirectly the piston, to the crank shaft. These forces tend to flatten the wrist pin and to force it out of axial alignment with the pin boss, the result being that much of the force transmitted in the operation is temporarily localized at the upper, i. e. piston head adjacent, inner portion of the boss bearing surface. This localized stress causes fatigue failure, usually cracking, at the upper inner edge of the boss and, consequently, an eventual failure of the piston at or around that area.

It is the object of this invention to provide piston assemblies in which the coextensive bearing surfaces of the wrist pin or of the pin bosses, or of both, are so disposed as to minimize these difficulties. My invention, which is directed towards this and similar objects, is best described with reference to specific assemblies embodying its principles and operation. Examples of such assemblies are schematically shown in the accompanying drawing in which:

Fig. 1 is a vertical sectional view of a conventional piston and wrist pin;

Fig. 2 is a view of the assembly of Fig. 1 at the time force is applied to the head of the piston;

Fig. 3 is a view taken through the boss and wrist pin of the section 3—3 of Fig. 2;

Fig. 4 is a section taken as indicated by the section line 4—4 of Fig. 2 to show the bearing area between boss and pin under the conditions illustrated in Fig. 2;

Figs. 5 to 8, inclusive, show similar sections under similar conditions through a piston assembly embodying the principles of my invention, Fig. 5 corresponding to Fig. 1, Fig. 6 corresponding to Fig. 2, Fig. 7 corresponding to Fig. 3 and Fig. 8 corresponding to Fig. 4; and Figs. 9 and 10 illustrate another preferred form of the invention, Fig. 9 being a vertical section through a piston, showing the piston assembly and being comparable with Figs. 1 and 5, and Fig. 10 showing the piston assembly as force is applied to the piston head and being comparable to Figs. 2 and 6.

In the drawing the deflections and distortions shown, as well as the contouring of pin boss and pin, are greatly magnified in order to illustrate the principles and effects of this invention.

The drawing, in which like numerals designate like parts, shows a conventional piston 1 having a head 2 to which is attached, or from which directly or indirectly, according to the particular design of the piston in question, depend the spaced pin bosses 3. Wrist pin 4 fits within said bosses and is attached to the connecting rod 5 in the usual manner. As the piston 1, under driving force (illustrated by arrows) applied to the force receiving surface 6 of the head 2, reciprocates in a cylinder, not shown, the reciprocating motion of the piston is transmitted to the connecting rod 5 through the pin 4 which, having its ends located in the pin bosses 3, forms a connection between the rod and the piston, allowing rotary movement around the axis of the piston pin.

When a conventional piston and wrist pin are assembled, their relationship is that schematically shown in Fig. 1, the pin and the pin bosses being normally in axial alignment on the axis shown by the dotted line 7 and lying below the force receiving head surface 6. When force is applied to the piston head, as shown by the arrows in Fig. 2, the resistance of the connecting rod 5 to the downward force of the piston tends to distort the pin in the manner shown (greatly exaggerated) in Fig. 2, the result being that the pin is no longer in axial alignment with the bore of the pin boss and the contact of the wrist pin with the upper portions of the bearing surfaces of the boss, i. e. those portions adjacent the force receiving piston head, is limited to an area on the inner portions of the upper boss bearing surface, the area being typified by the shaded area shown at 8 in Fig. 4. At the same time, the wrist pin, which is usually of hollow construction, tends to flatten, as schematically shown in Fig. 3, which further creates high tension forces on the upper side of the boss bearing surfaces at the inner edge thereof as well as causing distortion of the boss. This force concentrated in the bearing area 8 causes both excess tensile and compressive stresses in that portion of the piston immediately above said area, and the constant application of this localized stress as the piston reciprocates finally causes complete or partial fatigue failure of the piston at that point.

In order to minimize these difficulties, the present invention presents an improvement of the conventional pin and piston assembly in which the bearing surfaces in the boss or the boss engaging surfaces of the pin, or both, are so contoured that when the head of the piston is not loaded by the driving force the pin will engage the upper boss surface only at points removed from the inner edge of the boss bore so as to form an arcuate wedge-like space separating the boss surface from the coextensive wrist pin surface over a distance from the upper inner edge of the boss to the point of engagement of upper boss surface and the pin, said space of separation being at a maximum at the inner edge of the boss and more or less tapering to the initial point of engagement of the upper boss bearing surface with the pin. This result may be obtained in more than one manner. Two forms of an assembly incorporating the invention will now be described.

Referring first to Figs. 5 to 8, inclusive, and specifically comparing Fig. 5 with Fig. 1, which latter shows a conventional assembly, it will be noted that the pin 4 shown in Fig. 5 has been provided with a gradually decreasing diameter and is thus so tapered inwardly toward its connection with connecting rod 5 that when the piston is not under load the pin engages the upper boss bearing surface at points 9 which are substantially removed from the inner edge 10 of said upper boss surface. The taper which accomplishes this result is, as shown in Fig. 5, greatly exaggerated. Actually the clearances necessary to achieve the purposes of this invention are relatively minute, a taper of .002 inch is often sufficient. When force is applied to the piston head, as shown in Fig. 6, the localized tensile stresses which normally occur at the inner edge 10 of the upper surface of the boss and the localized compressive stresses which occur in an upwardly extending area above said inner edge 10 are comparatively lower since the distortion, under the applied force, of the wrist pin from its axial alignment with the bore results in an increase in the total bearing area between the pin and the upper surfaces of the boss bore, the final bearing area at the moment of greatest applied force being schematically shown at Fig. 8 by the shaded area 8 and being considerably greater than the bearing area in a conventional assembly, such as is schematically illustrated at 8 in Fig. 4. Together with this increased area of contact under load, such as results in a piston assembly of the type shown in Fig. 5, is the further advantage that as the pin flattens under pressure the initial smaller diameter of the wrist pin allows the pin to conform to the bore of the wrist pin boss, leaving a clearance between boss and pin through the horizontal plane of the boss and thus allowing the pin to flatten without exerting a great tendency to flatten the boss, the improved operation of the pin in this respect being shown by a comparison between Figs. 7 and 3, the latter showing the conventional assembly.

Another preferred form which the invention may take is illustrated in Figs. 9 and 10. In this case a conventional wrist pin is used, such as that shown at 4 in Fig. 1, but the bores of the wrist pin bosses are formed in the piston at a slight angle in relation to a line at right angles to the piston axis. Referring to Fig. 9, in which this condition is shown in exaggerated form, each wrist pin boss bore is located with its central axis 11 being slightly canted so as to diverge from a line at right angles to the central axis of the piston, which line 12 would normally, in a conventional type assembly, represent the central axis of the wrist pin bores. The inclination of the wrist pin boss bore will always be downwardly from the inner edge 10 of the upper surface of the bore so that when the conventional wrist pin is assembled in said bore, as is shown in Fig. 9, contact between the upper bore surface and the pin will be substantially removed from the inner edge of said surface, thus leaving a space between pin and bore over a substantial length of the bore, which space is at a maximum at the edge of the inner bore surface and tapers more or less to the point of engagement of the upper bore surface and pin. When such an assembly as shown in Fig. 9 is loaded by force applied to the piston head, the condition schematically shown in Fig. 10 is reached, the pin being deflected upwardly will increasingly bear on the upper bearing surfaces of the boss as the load increases, thus creating a bearing area similar to that shown at 8 in Fig. 8, the result being that the localized tensile and compressive stresses heretofore mentioned as occurring at the inner edge of the upper surface of the bore and the head area immediately thereabove are substantially reduced.

Rather than machining the pin boss bores in such a manner as to provide the desired clearance above the wrist pin, a convenient alternative method is to form the bores initially in the usual manner so that the walls thereof are normal to the vertical axis of the piston, and after assembling the piston, wrist pin, and connecting rod, heat the piston to a suitable temperature, and apply a sufficient load to the piston that the wrist pin bends in the manner indicated in Fig. 2 and stresses the metal of the upper portion of the wall of the wrist pin bore slightly beyond its elastic limit, thereby giving that metal a permanent set similar in contour to that shown in Fig. 9.

Accelerated tests of an aircraft piston assembly designed with a tapered pin in accordance with the design schematically indicated in Fig. 5, the taper on each side of the pin being .002 inch for the length of the pin in the pin boss, indicated that approximately twice the number of loading cycles could be obtained before the point of incipient failure was reached than could be obtained on the conventional type of piston shown in Fig. 1. Tests have further shown that when the principles of this invention are followed, the progression of fatigue cracks appearing at the inner upper edge of the upper boss bearing surface is much slower than in the case of a conventional piston assembly.

It will be apparent that the actual dimensioning of wrist pin and boss bore will be governed by size and design of the piston and exact dimensions thereof form no part of this invention. The governing factor is the amount of deflection of the wrist pin under the load applied and the contouring of the wrist pin or of the boss bore, or of both, should be so adjusted that firm contact of the pin over a substantial portion of the upper boss bearing surface is established at the moment of maximum load. It will be noted on comparison of conventional piston assemblies with the assemblies embodying my invention such as assemblies here specifically illustrated, that while the deflection of the pin is the same for any given size of pin and load under comparative conditions whether the assembly be of conventional design or be in accordance with the teachings of the invention, the wrist pin in assemblies embodying this invention will establish with the upper bearing surface of the pin boss an increasing area of contact in the direction of the center of the piston as force is applied to the piston head instead of the decreasing area of contact with said upper bearing boss surface which is now the result of conventional piston assembly operations.

Although the invention has been described with reference to assemblies in which a wedge-like space is provided initially between the upper inner portion of the bearing surface of the wrist pin boss and the wrist pin, this clearance need not exist initially, i. e., when the assembly is at room temperature. Rather, the clearance may be developed by expansion of the metal of the pin boss during operation of the piston. For example, a tapered wrist pin of the type shown in Fig. 5 may be inserted in a piston so that it has a shrunk fit in the pin bosses, the fit being sufficiently close that at room temperature there is line contact throughout between the wrist pin boss and the wrist pin portion encompassed by the boss. However, when the pin boss expands as the piston heats up in operation, clearance is developed between the wrist pin boss and the tapered portion of the wrist pin.

While I have described my invention and features thereof with reference to particular assemblies of specific design, I do not intend to limit myself to such specific assemblies except as such limitations may appear in the appended claims.

I claim:

1. In a piston assembly, a piston comprising a head having a force receiving surface, spaced bosses disposed transversely of the piston below said head surface and a wrist pin fitted within said bosses, the upper coextensive surfaces of pin and boss being so angularly disposed to each other that they are in contact near the outer end of the pin surface but are otherwise separated by an arcuate wedge-like space of maximum thickness at the inner edge of the boss and of gradually decreasing thickness outwardly therefrom, whereby force applied to said head surface will increase the area of contact between said coextensive upper surfaces in a direction toward the inner edge of the boss.

2. In a piston assembly, a piston comprising a head having a force receiving surface, spaced bosses disposed transversely of the piston below said head surface and a wrist pin fitted within said bosses, the central axis of each boss being at such an angle to the central axis of the pin fitted therein that the upper coextensive surfaces of pin and boss are in contact near the outer end of the pin surface and are otherwise separated by an arcuate wedge-like space of maximum thickness at the inner edge of the boss and of gradually decreasing thickness outwardly therefrom, whereby force applied to said head surface will increase the area of contact between said coextensive upper surfaces in a direction towards the inner edge of the boss.

3. In a piston assembly, a piston comprising a head having a force receiving surface, spaced axially aligned bosses disposed transversely of the piston below said head surface and a wrist pin fitted within said bosses in normal axial alignment therewith, that portion of the pin which is coextensive with a boss having a maximum diameter at its outer end and being of gradually decreasing diameter towards and to its inner end whereby force applied to said head surface will increase the area of contact between the coextensive upper surfaces of pin and boss.

RUSSELL G. ANDERSON.